United States Patent [19]

Pfundstein

[11] Patent Number: 5,707,050
[45] Date of Patent: Jan. 13, 1998

[54] MOUNTING ARRANGEMENT FOR A TORSION BAR OF A VEHICLE TORSION BAR WHEEL SUSPENSION SYSTEM

[75] Inventor: Wolfgang Pfundstein, Stuttgart, Germany

[73] Assignee: Mercedes Benz AG, Stuttgart, Germany

[21] Appl. No.: 805,355

[22] Filed: Feb. 24, 1997

[30] Foreign Application Priority Data

Mar. 13, 1996 [DE] Germany ................ 19609814

[51] Int. Cl.⁶ ............ B60G 11/18; B60G 11/20
[52] U.S. Cl. ............ 267/273; 267/154; 267/277
[58] Field of Search ............ 267/273, 154, 267/274, 277, 281, 284; 280/723, 721, 666

[56] References Cited

U.S. PATENT DOCUMENTS

| | | |
|---|---|---|
| 2,631,844 | 3/1953 | Paton . |
| 2,972,489 | 2/1961 | Collier et al. . |
| 3,037,789 | 6/1962 | Alison . |
| 4,635,958 | 1/1987 | Yonemoto . |
| 4,869,480 | 9/1989 | Beuth et al. ............ 267/273 |

FOREIGN PATENT DOCUMENTS

| | | |
|---|---|---|
| 57-099406 | 6/1982 | Japan . |
| 57-167810 | 10/1982 | Japan . |
| 58-128909 | 8/1983 | Japan . |
| 04163217 | 6/1992 | Japan . |
| 04252715 | 9/1992 | Japan . |
| 1 171 713 | 11/1969 | United Kingdom . |

OTHER PUBLICATIONS

Martin Ruch, Günter Skrobanek, "So Wird's Gemacht", 1992.

*Primary Examiner*—Douglas C. Butler
*Attorney, Agent, or Firm*—Klaus J. Bach

[57] ABSTRACT

In a mounting arrangement for a torsion bar of a torsion bar vehicle wheel suspension wherein the torsion bar is mounted at its one end to a cross link of a vehicle wheel suspension the other end of the torsion bar is connected to a mounting shoe which is engaged with the vehicle chassis only by the torque forces transmitted through the torsion bar.

5 Claims, 2 Drawing Sheets

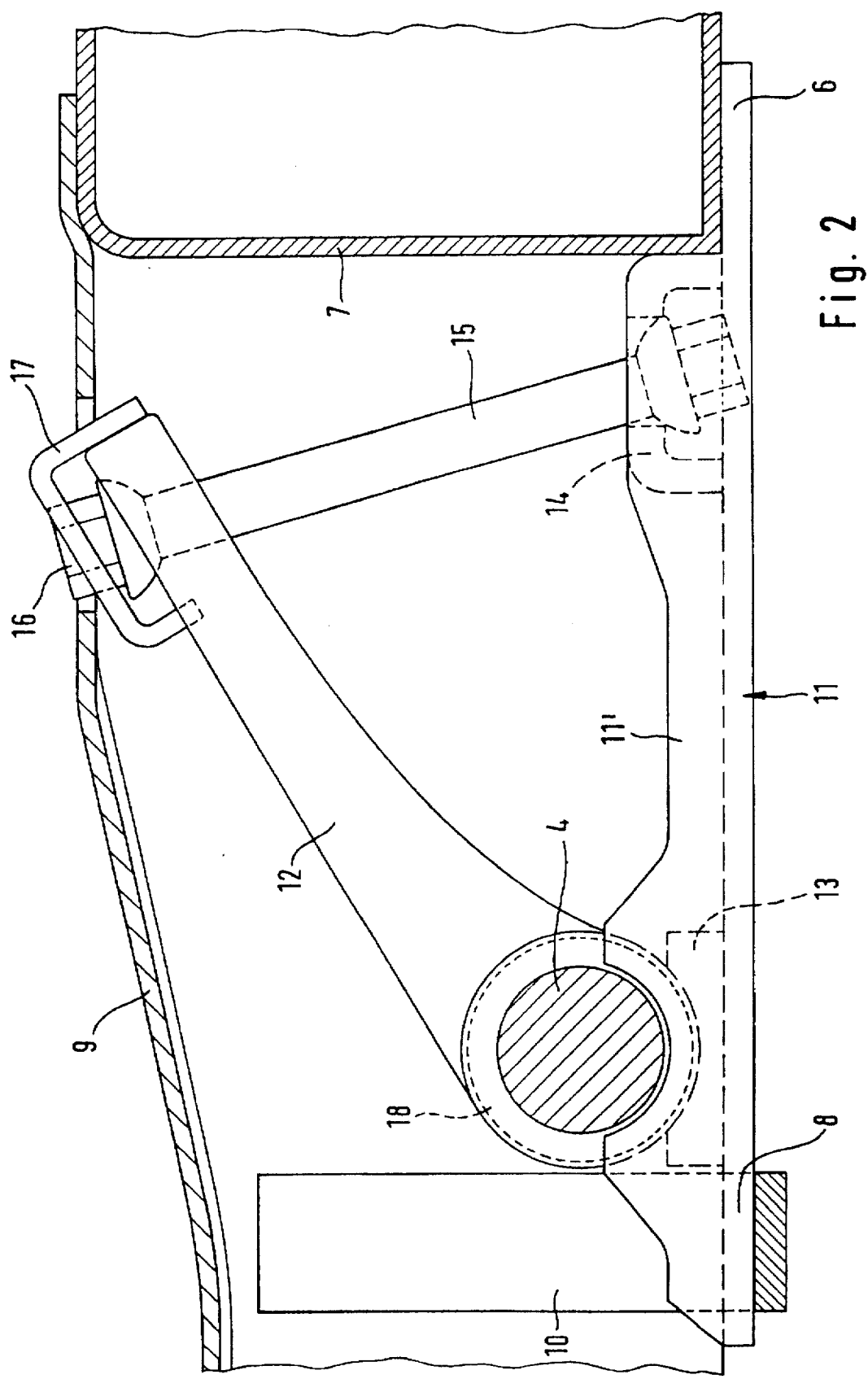

MOUNTING ARRANGEMENT FOR A TORSION BAR OF A VEHICLE TORSION BAR WHEEL SUSPENSION SYSTEM

BACKGROUND OF THE INVENTION

The invention relates to a mounting arrangement for the end of a torsion bar remote from the wheel of a a vehicle wheel torsion bar suspension system.

Motor vehicles with torsion bar suspensions are basically known. The torsion bar springs may be linear wheel springs arranged in the longitudinal direction of the vehicle. One end of the torsion bar may be operatively connected for rotation with a crosslink of a wheel, while the other end of the torsion bar is rigidly fastened to a part of the vehicle chassis. The wheel force is thus transferred via the crosslink as a torque to the torsion bar which is firmly supported by the chassis of the vehicle.

The mounting structure for the end of the torsion bar to the chassis remote from the wheel is usually designed in such a way that the ground clearance of the vehicle can be adjusted to a desired value. For this purpose, a control arm is provided at the end of the torsion bar remote from the wheel. The mounting arm is connected securely to the torsion bar and, together with the latter, is mounted on the chassis so as to be pivotable about its axis. The free end of the control arm is secured to the chassis by means of a tie bolt so as to be adjustable relative to the chassis. The control arm, or rather, the part of the torsion bar adjacent the control arm is supported by a bearing structure arranged on a crossmember of the chassis. Because of the high torque transmitted through the torsion bar, the mounting area and the surroundings of the rotary bearing of the control arm and the torsion bar on the chassis must be reinforced to provide for a high load-bearing capacity.

The design of the chassis can thus become comparatively complex. Furthermore, it may be quite difficult to control production tolerances, with the result that the torsion bar may also be subjected to undesirable bending moments.

It is the object of the present invention to provide a mounting arrangement for a torsion bar whereby the torsion bar can be easily mounted.

SUMMARY OF THE INVENTION

In a mounting arrangement for a torsion bar of a torsion bar vehicle wheel suspension wherein the torsion bar is mounted at its one end to a cross link of a vehicle wheel suspension the other end of the torsion bar is connected to a mounting shoe which is engaged with the vehicle chassis only by the torque forces transmitted through the torsion bar.

With the mounting arrangement for the torsion bar end remote from the wheel according to the invention an assembly is provided which is separate from the chassis and which is designed in such a way that it only interacts with appropriate support surfaces on the chassis for torque support. Consequently, no complex bearing arrangements have to be provided on the chassis. Rather, it is sufficient to arrange and design the support surfaces such that the mounting shoe which can be pre-mounted onto the torsion bar can simply engage the chassis surface.

A particular advantage of the invention lies in the fact that the chassis side support can readily have a relatively wide tolerance range in which the mounting shoe can be securely supported so that distortion of the torsion bar in the mounted state can be avoided.

Various features of the invention will become apparent from the following description of the invention on the basis of the accompanying drawings.

BRIEF DESCRIPTION OF THE DRAWINGS

FIG. 2 is a side view of the mounting shoe in the installed position and it shows also a crossmember of the chassis.

DESCRIPTION OF A PREFERRED EMBODIMENT

Figure 1:
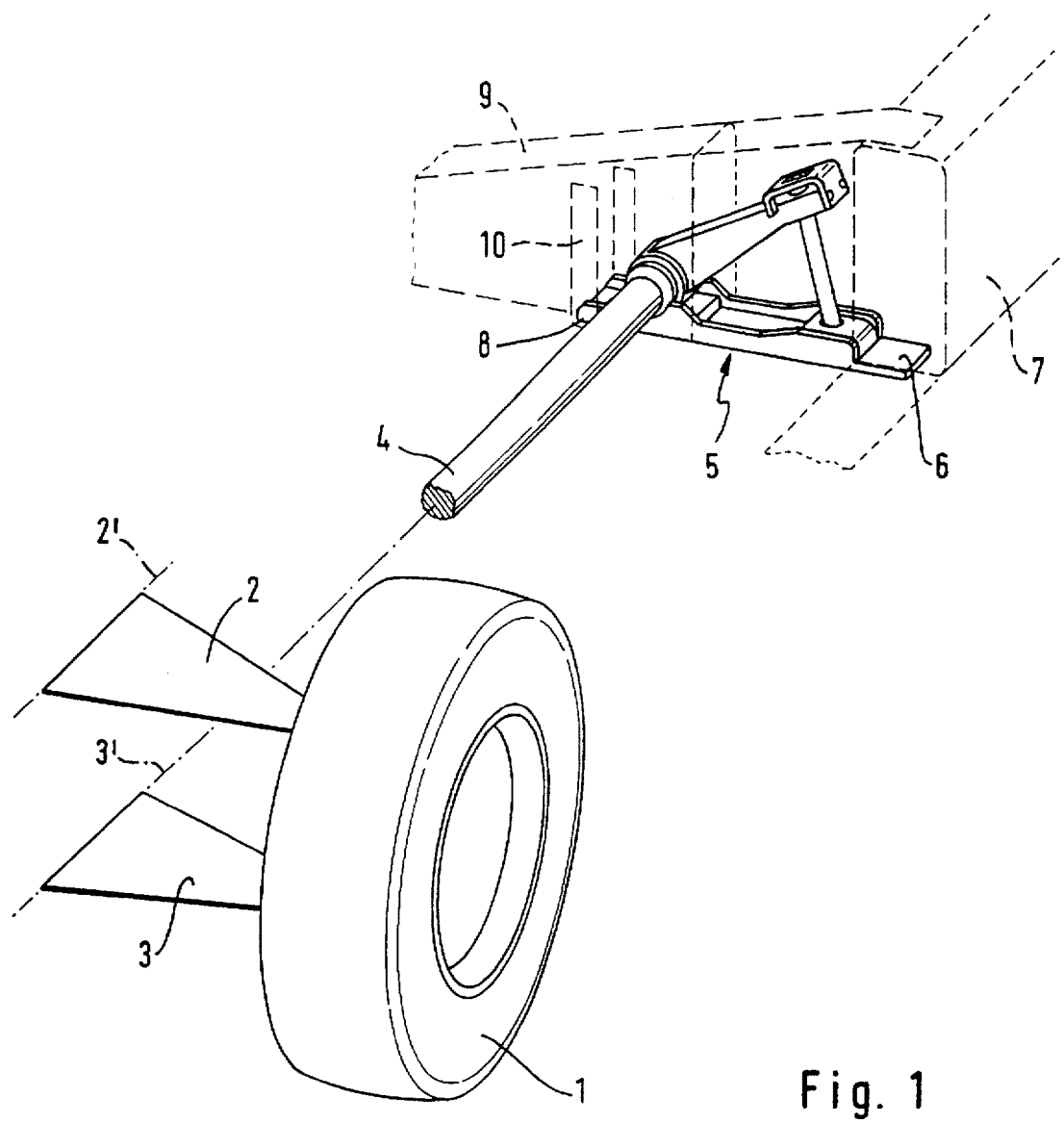
FIG. 1 shows a schematic perspective view of a wheel suspension with a torsion bar spring having a mounting shoe at the end thereof remote from the wheel by which the torsion bar is secured to the chassis.

As shown in FIG. 1, a vehicle wheel 1 is fastened to the chassis (not illustrated in detail) by means of upper and lower crosslinks 2 and 3 in a manner which is basically known. During upward or downward wheel travel, the crosslinks 2 and 3 pivot about bearing axes 2' and 3' of rotary bearing by which the control links are mounted on the chassis.

The lower crosslink 3 or a part thereof is operatively connected for rotation with the wheel-side end of a torsion bar 4 which is coaxial with the bearing axis 3' and whose end remote from the wheel is firmly mounted in a mounting shoe 5 in a manner illustrated below. The mounting shoe 5 is secured to the chassis as is also described below in greater detail.

Under the weight of the vehicle, the vehicle wheel 1 attempts to move in an upward direction relative to the chassis whereby, in the representation of FIG. 1, the wheel-side end of the torsion bar 4 is twisted counter-clockwise relative to the end of the torsion bar 4 remote from the wheel. The torsion bar 4 is pre-stressed so as to provide a desired ground clearance for the vehicle.

The torsion bar 4 is subjected to an extremely strong torque particularly when the vehicle wheel 1 reaches its end position, which, in the direction of wheel deflection, is predetermined by the design of the wheel suspension. However, a torque always acts on the support shoe 5, and, in the example of FIG. 1, attempts to turn the support shoe counter-clockwise about the axis of the torsion bar 4.

According to the invention, the mounting shoe 5 is fastened securely against rotation by two end flanges 6 and 8 of which the one end flange 6 rests on the underside of a longitudinal member 7 of the chassis and the other end flange 8 of the mounting shoe 5 rests on the top of a bracket part 10 mounted on a crossmember 9 of the chassis. Because the torsion bar 4 is always subjected to a torque engagement forces are always present for the flange 6 with the underside of the longitudinal member 7 and for the flange 8 with the top side of the bracket part 10 of the cross member 9. As a result, the mounting shoe 5 is securely clamped to the chassis parts 7 and 9 or 10 solely due to the spring torque of the torsion bar so that no other fastening means such as bolts or rivets are required.

With appropriate dimensioning of the flanges 6 and 8 and of the respective bearing surfaces on the chassis, the engagement forces can be distributed over a large area of the chassis.

A particular advantage of the invention resides in the fact that a relatively large tolerance range can be provided for the mounting arrangement of the shoe 5 on the chassis—in the example of FIG. 1 on the longitudinal member 7 and on the crossmember 9—since there are no fastening means which would require a precisely predetermined positioning of the mounting shoe. The mounting shoe 5 can therefore always be arranged such that when mounted, the torsion bar 4 is not subjected to bending loads.

The entire mounting shoe 5, with the exception of its flange 6 disposed below the longitudinal member 7, can be accommodated in the area where the cross member 9 joins the longitudinal member 7. Preferably, the cross-member 9 has a box or U-shaped profile which is open towards the bottom and which receives the mounting shoe 5.

The longitudinal member 7 may also have a box-shaped profile which is closed to form a tubular structure.

As shown in FIG. 2, the mounting shoe 5 has a base plate 11 which forms, at its opposite ends the flanges 6 and 8 and has reinforcement walls 11' bent upwards so that the base plate 11 has a flat U-shaped profile which is open towards the top. In this case, the reinforcement walls 11' have near the flanges 6 and 8 an increased height provided with a circular arc-shaped recess for receiving the torsion bar 4. Between the spaced reinforcement walls 11' of the base plate 11, the torsion bar 4 is engaged in a receiving opening of a control lever 12 which is firmly secured to the end of the torsion bar 4. To achieve such firm connection, the receiving opening of the control lever 12 and the end of the torsion bar 4 have corresponding eccentric areas which fit into one another.

Adjacent the torsion bar 4 between the reinforcement walls 11', the base plate 11 carries a plastic bearing part 13 on which the end of the control lever 12 rests where it is joined to the torsion bar 4.

Near to the flange 6, the base plate 11 includes a bolt receiving recess 14 in which an adjusting bolt 15 is located whose head is accessible from the underside of the base plate 11. The adjusting bolt 15 is screwed into a nut 16 which is securely fastened to the free end of the control lever 12 by means of a locking clip 17 which also prevents rotation of the nut 16.

Because of the torque exerted by the torsion bar 4, the end of the control lever 12 which is connected to the torsion bar 4 is biased onto the plastic bearing part 13 and is thus securely held between the reinforcement walls 11' of the base plate 11. The adjusting bolt 15 is subjected to tensile stresses since, under the rotational torque, the free end of the control lever 12 is biased in a direction away from the base plate 11.

The rotational position of the mounting end of the torsion bar 4 can be adjusted by screwing the adjusting bolt 15 into or out of the nut 16 for adjusting the vehicle road clearance.

If the vehicle is involved in an accident, the torsion bar may transmit collision forces acting on a wheel to further remote regions of the chassis thereby reducing the forces acting on the front part of the vehicle. If, in the example of FIG. 1, the vehicle wheel 1 is one of the front wheels of the vehicle, in a frontal collision the wheel 1 with the crosslinks 2 and 3 may be pushed backwards. In this case, the wheel force is transmitted to the torsion bar 4 which is carried along by the lower crosslink. In order to prevent the torsion bar 4 from being pushed axially through the control lever 12 and from piercing a side wall of the crossmember 9, a disc 18 may be arranged at the end of the control lever 12 in the thrust direction of the torsion bar 4 between the lever and the adjacent reinforcement wall 11'. The disc projects on all sides beyond the edge of the opening of the control lever 12 receiving the torsion bar 4 and distributes the thrust force in such a case over a large area on the side wall of the crossmember 9 and/or the adjacent reinforcement wall 11' of the base plate 11. The crossmember 9 may thus absorb high thrust energies while being deformed.

What is claimed is:

1. A mounting arrangement for an end remote from a wheel of a torsion bar of a torsion bar suspension for a vehicle wheel which is supported on a vehicle chassis by cross-links, said mounting arrangement comprising: a mounting shoe arranged at the end of said torsion bar remote from said wheel and firmly fastened to said torsion bar so as to be non-rotatable relative to said torsion bar at least counter to a torque applied to the torsion bar by the associated wheel, said mounting shoe being engaged with said chassis only by the torque force effective on said mounting shoe.

2. A torsion bar mounting arrangement according to claim 1, wherein said chassis includes a crossmember joined to a longitudinal frame member, said cross member having an opening at its bottom in the region adjacent said longitudinal frame member and said mounting shoe has a first flange surface engaging the underside of said longitudinal frame member and at its opposite end a second flange engaging said crossmember.

3. A torsion bar mounting arrangement according to claim 1, wherein, within said mounting shoe, a control lever is mounted on the end of said torsion bar remote from said wheel and is adjustably supported within said mounting shoe.

4. A torsion bar mounting arrangement according to claim 3, wherein said mounting shoe comprises a base plate with upwardly projecting reinforcement walls and said control lever rests on a bearing part disposed on said base plate, said control lever having a free end connected to a region of said base plate remote from said bearing part by means of an adjusting bolt which retains said control lever and the end of said torsion bar in an adjustable position.

5. A torsion bar mounting arrangement according to claim 1, wherein said mounting shoe is supported on said chassis with a tolerance range permitting adjustment movement in axial direction of said torsion bar.

* * * * *